(12) United States Patent
Hamada et al.

(10) Patent No.: US 10,469,257 B2
(45) Date of Patent: Nov. 5, 2019

(54) MATRIX AND KEY GENERATION DEVICE, MATRIX AND KEY GENERATION SYSTEM, MATRIX COUPLING DEVICE, MATRIX AND KEY GENERATION METHOD, AND PROGRAM

(71) Applicant: NIPPON TELEGRAPH AND TELEPHONE CORPORATION, Chiyoda-ku (JP)

(72) Inventors: Koki Hamada, Musashino (JP); Dai Ikarashi, Musashino (JP); Naoto Kiribuchi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 117 days.

(21) Appl. No.: 15/537,567

(22) PCT Filed: Jan. 13, 2016

(86) PCT No.: PCT/JP2016/050850
§ 371 (c)(1),
(2) Date: Jun. 19, 2017

(87) PCT Pub. No.: WO2016/114309
PCT Pub. Date: Jul. 21, 2016

(65) Prior Publication Data
US 2018/0270056 A1 Sep. 20, 2018

(30) Foreign Application Priority Data
Jan. 15, 2015 (JP) .................................. 2015-005998

(51) Int. Cl.
*G06F 16/20* (2019.01)
*G06F 16/28* (2019.01)
(Continued)

(52) U.S. Cl.
CPC .............. *H04L 9/0861* (2013.01); *G09C 1/00* (2013.01); *H04L 9/085* (2013.01); *H04L 2209/46* (2013.01)

(58) Field of Classification Search
CPC ........ G06F 17/16; G06F 17/141; G06F 17/18; G06F 17/2785; G06F 15/18; G06F 17/10;
(Continued)

(56) References Cited

U.S. PATENT DOCUMENTS 5,481,610 A * 1/1996 Doiron .................. H04L 9/0894
380/270
5,721,779 A * 2/1998 Funk ....................... G06F 21/31
380/30
(Continued)

OTHER PUBLICATIONS

International Search Report dated Apr. 12, 2016, in PCT/JP2016/050850, filed Jan. 13, 2016.
(Continued)

*Primary Examiner* — Victor Lesniewski
*Assistant Examiner* — Howard H. Louie
(74) *Attorney, Agent, or Firm* — Oblon, McClelland, Maier & Neustadt, L.L.P.

(57) ABSTRACT

A vector generation unit generates a vector $x_n$ so that $x_n[i] \ne x_n[j]$ if $k_n[i]=k_n[j]$ at $i \ne j$. A set generation unit generates a set $B_{n,j}$ so that individual elements correspond to combinations of the N-1 pieces of elements, which are individually selected from sets $M_0, \ldots, M_{N-1}$ other than a set $M_n$, and $x_n[j]$ and the elements for all of the combinations are included. A matrix generation unit generates a matrix $T_n'$ so that the matrix $T_n'$ includes rows identical to $T_n[j]$ in the number equal to the number of elements of the set $B_{n,j}$. A key generation unit generates a vector $k_n'$ so that elements of the matrix $T_n'$ which correspond to a row identical to $T_n[j]$ correspond to combinations of $k_n[j]$ and elements of the set
(Continued)

$B_{n,j}$ and further, the elements of the set $B_{n,j}$ are different from each other when there are a plurality of rows identical to $T_n[j]$.

2 Claims, 9 Drawing Sheets

(51) Int. Cl.
    *H04L 29/06*     (2006.01)
    *G06F 21/62*     (2013.01)
    *G06F 21/60*     (2013.01)
    *H04L 9/08*     (2006.01)
    *G09C 1/00*     (2006.01)

(58) Field of Classification Search
    CPC ... H04L 9/0861; H04L 9/085; H04L 2209/46; G09C 1/00
    See application file for complete search history.

(56) References Cited

U.S. PATENT DOCUMENTS

| | | | | |
|---|---|---|---|---|
| 6,683,953 | B1* | 1/2004 | Kasahara | H04L 9/30 380/28 |
| 6,895,421 | B1* | 5/2005 | Dor | G06F 17/14 708/400 |
| 6,950,937 | B2* | 9/2005 | Jakobsson | G06F 7/723 380/37 |
| 8,005,868 | B2* | 8/2011 | Saborit | G06F 16/24556 707/796 |
| 2003/0131238 | A1* | 7/2003 | Vincent | H04L 9/32 713/176 |
| 2004/0185886 | A1* | 9/2004 | Matsumoto | H03M 13/1111 455/502 |
| 2006/0095236 | A1* | 5/2006 | Phillips | G06F 17/504 703/2 |
| 2006/0242065 | A1* | 10/2006 | Jogand-Coulomb | G06F 21/10 705/50 |
| 2007/0016838 | A1* | 1/2007 | Mielczarek | H04L 1/0013 714/749 |
| 2007/0097856 | A1* | 5/2007 | Wang | H04B 7/0417 370/210 |
| 2008/0022413 | A1* | 1/2008 | Holtzman | G06F 21/6218 726/27 |
| 2009/0022217 | A1* | 1/2009 | Kimata | H04B 7/0854 375/232 |
| 2013/0159731 | A1* | 6/2013 | Furukawa | H04L 9/0861 713/189 |
| 2014/0270153 | A1* | 9/2014 | Scarpino | H04L 9/0637 380/28 |
| 2014/0280375 | A1* | 9/2014 | Rawson | G06F 16/21 707/803 |
| 2015/0186352 | A1* | 7/2015 | Greenwood | G06F 16/24556 715/217 |
| 2016/0103207 | A1* | 4/2016 | Shirakawa | G01S 3/74 702/151 |
| 2016/0217195 | A1* | 7/2016 | Abrahams | H04L 67/306 |

OTHER PUBLICATIONS

Hamada et al., "Oblivious Radix Sort: An Efficient Sorting Algorithm for Practical Secure Multi-party Computation", IACR Cryptology ePrint Archive, vol. 2014, 2014, 19 pages.

Hamada et al., "An Algorithm for Computing Aggregate Median on Secure Function Evaluation", Computer Security Symposium 2012, Oct. 30-Nov. 1, 2012, p. 509-516, with English abstract.

Hamada et al., "An Equijoin Algorithm on Secure Function Evaluation", The 26th Annual Conference of the Japanese Society for Artificial Intelligence, 2012, 4 pages, with partial English translation.

Chida et al., "A Three-Party Secure Function Evaluation with Lightweight Verifiability Revisited", Computer Security Symposium, 2010, 6 pages, with English abstract.

* cited by examiner $$T_0 = \begin{bmatrix} 2 & 83 & 9 \\ 5 & 22 & 9 \\ 1 & 57 & 1 \\ 4 & 32 & 0 \\ 6 & 39 & 0 \end{bmatrix} \quad k_0 = \begin{bmatrix} 1 \\ 2 \\ 3 \\ 1 \\ 4 \end{bmatrix} \quad T_1 = \begin{bmatrix} \text{quick} \\ \text{merge} \\ \text{radix} \\ \text{heap} \end{bmatrix} \quad k_1 = \begin{bmatrix} 1 \\ 1 \\ 3 \\ 3 \end{bmatrix}$$

$$T_2 = \begin{bmatrix} 3.1 & 1 \\ 4.1 & 5 \\ 5.9 & 6 \\ 2.6 & 2 \\ 5.3 & 7 \end{bmatrix} \quad k_2 = \begin{bmatrix} 1 \\ 2 \\ 2 \\ 2 \\ 4 \end{bmatrix}$$

MATRIX (TABLE) OBTAINED BY COUPLING $T_0$ AND $T_1$ WITH $k_0$ AND $k_1$ AS KEYS $$\begin{bmatrix} 2 & 83 & 9 & \text{quick} \\ 2 & 83 & 9 & \text{merge} \\ 4 & 32 & 0 & \text{quick} \\ 4 & 32 & 0 & \text{merge} \\ 1 & 57 & 1 & \text{radix} \\ 1 & 57 & 1 & \text{heap} \end{bmatrix}$$

MATRIX (TABLE) OBTAINED BY COUPLING $T_0$, $T_1$, AND $T_2$ WITH $k_0$, $k_1$, AND $k_2$ AS KEYS $$\begin{bmatrix} 2 & 83 & 9 & \text{quick} & 3.1 & 1 \\ 2 & 83 & 9 & \text{merge} & 3.1 & 1 \\ 4 & 32 & 0 & \text{quick} & 3.1 & 1 \\ 4 & 32 & 0 & \text{merge} & 3.1 & 1 \end{bmatrix}$$

FIG. 2

$$
\text{BEFORE SORTING} \quad T_0 = \begin{bmatrix} \|2\| & \|83\| & \|9\| \\ \|5\| & \|22\| & \|9\| \\ \|1\| & \|57\| & \|1\| \\ \|4\| & \|32\| & \|0\| \\ \|6\| & \|39\| & \|0\| \end{bmatrix} \quad k_0 = \begin{bmatrix} \|1\| \\ \|2\| \\ \|3\| \\ \|1\| \\ \|4\| \end{bmatrix}
$$

$$
\text{AFTER SORTING} \quad T_0 = \begin{bmatrix} \|2\| & \|83\| & \|9\| \\ \|4\| & \|32\| & \|0\| \\ \|5\| & \|22\| & \|9\| \\ \|1\| & \|57\| & \|1\| \\ \|6\| & \|39\| & \|0\| \end{bmatrix} \quad k_0 = \begin{bmatrix} \|1\| \\ \|1\| \\ \|2\| \\ \|3\| \\ \|4\| \end{bmatrix}
$$

FIG. 5

$$
k_0 = \begin{bmatrix} \|1\| \\ \|1\| \\ \|2\| \\ \|3\| \\ \|4\| \end{bmatrix} \quad x_0 = \begin{bmatrix} \|1\| \\ \|2\| \\ \|1\| \\ \|1\| \\ \|1\| \end{bmatrix} \quad k_1 = \begin{bmatrix} \|1\| \\ \|1\| \\ \|3\| \\ \|3\| \end{bmatrix} \quad x_1 = \begin{bmatrix} \|1\| \\ \|2\| \\ \|1\| \\ \|2\| \end{bmatrix}
$$

$$
k_2 = \begin{bmatrix} \|1\| \\ \|2\| \\ \|2\| \\ \|2\| \\ \|4\| \end{bmatrix} \quad x_2 = \begin{bmatrix} \|1\| \\ \|1\| \\ \|2\| \\ \|3\| \\ \|1\| \end{bmatrix}
$$

FIG. 6

$$T_0' = \begin{bmatrix} \|2\| & \|83\| & \|9\| \\ \|2\| & \|83\| & \|9\| \\ \|4\| & \|32\| & \|0\| \\ \|4\| & \|32\| & \|0\| \\ \|5\| & \|22\| & \|9\| \\ \|5\| & \|22\| & \|9\| \\ \|1\| & \|57\| & \|1\| \\ \|1\| & \|57\| & \|1\| \\ \|6\| & \|39\| & \|0\| \\ \|6\| & \|39\| & \|0\| \end{bmatrix} \quad k_0' = \begin{bmatrix} (\|1\|,(\|1\|,\|1\|)) \\ (\|1\|,(\|1\|,\|2\|)) \\ (\|1\|,(\|2\|,\|1\|)) \\ (\|1\|,(\|2\|,\|2\|)) \\ (\|2\|,(\|1\|,\|1\|)) \\ (\|2\|,(\|1\|,\|2\|)) \\ (\|3\|,(\|1\|,\|1\|)) \\ (\|3\|,(\|1\|,\|2\|)) \\ (\|4\|,(\|1\|,\|1\|)) \\ (\|4\|,(\|1\|,\|2\|)) \end{bmatrix}$$

$$T_1' = \begin{bmatrix} \|quick\| \\ \|quick\| \\ \|merge\| \\ \|merge\| \\ \|radix\| \\ \|radix\| \\ \|heap\| \\ \|heap\| \end{bmatrix} \quad k_1' = \begin{bmatrix} (\|1\|,(\|1\|,\|1\|)) \\ (\|1\|,(\|2\|,\|1\|)) \\ (\|1\|,(\|1\|,\|2\|)) \\ (\|1\|,(\|2\|,\|2\|)) \\ (\|3\|,(\|1\|,\|1\|)) \\ (\|3\|,(\|2\|,\|1\|)) \\ (\|3\|,(\|1\|,\|2\|)) \\ (\|3\|,(\|2\|,\|2\|)) \end{bmatrix}$$

FIG. 7

MATRIX AND KEY GENERATION DEVICE, MATRIX AND KEY GENERATION SYSTEM, MATRIX COUPLING DEVICE, MATRIX AND KEY GENERATION METHOD, AND PROGRAM

TECHNICAL FIELD

The present invention relates to a matrix and key generation device, a matrix and key generation system, a matrix coupling device, a matrix and key generation method, and a program for processing data constituted of rows and columns of a table or the like.

BACKGROUND ART

Non-patent Literature 1 discloses a technique in which sorting of orders of rows of a matrix and sorting of orders of elements of a vector are performed by secure computation, with respect to the matrix of which elements are concealed and vectors which corresponds to each row of the matrix and includes concealed elements, in accordance with the elements of the vectors while keeping the elements concealed. Non-patent Literature 2 discloses a technique in which computation for counting the number of times of appearance (the number of pieces of duplication) of an identical element (referred to below as "step computation") is performed while keeping the elements concealed and concealed results are outputted. FIG. 1 illustrates a general outline of the step computation. Here, $\| \ \|$ is a symbol representing a concealed state. Since $\|1\|$ which is the first element of the input appears for the first time, the first element of the output is $\|1\|$. Since $\|2\|$ which is the second element of the input appears for the first time, the second element of the output is $\|1\|$. Since $\|2\|$ which is the third element of the input appears for the second time, the third element of the output is $\|2\|$. Since $\|3\|$ which is the sixth element of the input appears for the third time, the sixth element of the output is $\|3\|$. Thus, through the performance of the step computation, the number of times of appearance of an identical element (the number of pieces of duplication) is counted and a result thereof is outputted. Non-patent Literature 3 discloses a technique in which a plurality of matrices of which elements are concealed are coupled based on concealed elements of vectors corresponding to respective matrices with a small amount of communication. Non-patent Literature 4 discloses a technique for concealing data (distribution processing), a technique for reconstructing concealed data (reconstruction processing), a technique in which addition, multiplication, and verification (verification of whether two concealed data are equal to each other) are performed in a state that the concealed data are kept concealed so as to obtain concealed results, and the like.

PRIOR ART LITERATURE

Non-Patent Literature

Non-patent Literature 1: Koki Hamada, Dai Ikarashi, Koji Chida, and Katsumi Takahashi, "Oblivious radix sort: An efficient sorting algorithm for practical secure multi-party computation", IACR Cryptology ePrint Archive, Vol. 2014, p. 121, 2014.
Non-patent Literature 2: Koki Hamada, Dai Ikarashi, and Koji Chida, "An Algorithm for Computing Aggregate Median on Secure Function Evaluation", In CSS, 2012.
Non-patent Literature 3: Koki Hamada, Ryo Kikuchi, Dai Ikarashi, and Koji Chida, "An Equijoin Algorithm on Secure Function Evaluation", the collection of papers of the 26th Annual Conference of the Japanese Society for Artificial Intelligence, June 2012.
Non-patent Literature 4: Koji Chida, Koki Hamada, Dai Ikarashi, and Katsumi Takahashi, "A Three-party Secure Function Evaluation with Lightweight Verifiability Revisited", In CSS, 2010.

SUMMARY OF THE INVENTION

Problems to be Solved by the Invention

The technique for coupling matrices described in Non-patent Literature 3 realizes coupling of matrices through secure computation with a small amount of communication on the assumption that there is no duplication among elements of a vector which is a key of the coupling. However, this technique cannot be used disadvantageously in the case where there is duplication among elements of a vector. In order to make the technique for coupling matrices of Non-patent Literature 3 applicable, it is necessary to convert a vector which includes duplicate elements and a matrix which is a coupling object respectively into a vector which includes no duplicate elements and a matrix corresponding to the vector.

An object of the present invention is to provide a technique for converting a vector which includes duplicate elements and a matrix which is a coupling object respectively into a vector which includes no duplicate elements and a matrix corresponding to the vector.

Means to Solve the Problems

First, it is assumed that N is an integer which is 1 or larger, n is an integer which is between 0 and N−1 inclusive, $K_n$ is an integer which is 1 or larger, i and j are integers, $T_n$ is a matrix having $K_n$ rows, $k_n$ is a vector which includes $K_n$ pieces of elements, $T_n[j]$ is a row on a j-th order of the matrix $T_n$, $k_n[j]$ is an element on a j-th order of the vector $k_n$, and $m_n$ is an upper limit number in which the elements of the vector $k_n$ are duplicated. It is assumed that the element on the j-th order of the vector $k_n$ is an element corresponding to a row on the j-th order of the matrix $T_n$.

The first invention of the present invention is a technique which can be combined with the matrix coupling described in Non-patent Literature 3 and is limited to secure computation. In the first invention, it is assumed that $\| \ \|$ is a sign representing concealed data and $M_n$ is a set whose elements are $\|1\|, \ldots, \|m_n\|$. The matrix and key generation device according to the first invention constitutes a matrix and key generation system by three or more matrix and key generation devices which are mutually connected via a network. In the matrix and key generation system, secure computation can be performed among the matrix and key generation devices while performing data communication. Further, the numbers of rows and columns of the matrix $T_n$, the number of elements of the vector $k_n$, and the value $m_n$ are unconcealed information and each element of the matrix $T_n$ and each element of the vector $k_n$ are concealed information among the matrix and key generation devices. The matrix and key generation device includes a sort unit, a vector generation unit, a set generation unit, a matrix generation unit, and a key generation unit.

The sort unit performs sorting of orders of rows of the matrix $T_n$ and sorting of orders of elements of the vector $k_n$ with respect to each of n=0, . . . , N−1 through secure computation with sort units of other matrix and key generation devices in accordance with the elements of the vector $k_n$ while maintaining correspondence, so as to update matrices $T_0, \ldots, T_{N-1}$ and vectors $k_0, \ldots, k_{N-1}$ with the matrices and the vectors after the sorting. The vector generation unit, the set generation unit, the matrix generation unit, and the key generation unit perform processing with respect to the matrices $T_0, \ldots, T_{N-1}$ and the vectors $k_0, \ldots, k_{N-1}$ which are updated by the sort unit. The vector generation unit generates a vector $x_n$, of which a number of pieces of elements is $K_n$ and each of the elements is concealed, with respect to each of $n=0, \ldots, N-1$ through secure computation with vector generation units of other matrix and key generation devices so that $x_n[1]=\|1\|$ and $x_n[i]=\|x_n[i-1]+1\|$ if $k_n[i-1]=k_n[i]$ and $x_n[i]=\|1\|$ if $k_n[i-1] \neq k_n[i]$ with respect to $2 \leq i \leq K_n$. The set generation unit generates a set $B_n$ of which each element is concealed, with respect to each of $n=0, \ldots, N-1$ and each of $j=1, \ldots, K_n$ through secure computation with set generation units of other matrix and key generation devices so that individual elements correspond to combinations of $N-1$ pieces of elements, the $N-1$ pieces of elements being individually selected from sets $M_0, \ldots, M_{N-1}$ other than the set $M_n$, and $x_n[j]$, and the elements for all of the combinations are included. The matrix generation unit generates a matrix $T_n'$, of which each element is concealed, with respect to each of $n=0, \ldots, N-1$ through secure computation with matrix generation units of other matrix and key generation devices, so that rows identical to $T_n[j]$ are included in a number equal to a number of elements of the set $B_{n,j}$ for all of $j=1, \ldots, K_n$. The key generation unit generates a vector $k_n'$, of which each element is concealed, with respect to each of $n=0, \ldots, N-1$ through secure computation with key generation units of other matrix and key generation devices, so that an element of the matrix $T_n'$, the element corresponding to a row identical to $T_n[j]$, corresponds to a combination of $k_n[j]$ and an element of the set $B_{n,j}$ and further, the elements of the set $B_{n,j}$ are different from each other when there are a plurality of rows identical to $T_n[j]$.

The second invention of the present invention is a technique for converting a vector which includes duplicate elements and a matrix which is a coupling object respectively into a vector which includes no duplicate elements and a matrix corresponding to the vector without performing secure computation. In the second invention, it is assumed that $M_n$ is a set composed of $m_n$ pieces of elements which are different from each other and $M_n[i]$ is an element on the i-th order of the set $M_n$. Further, it is assumed that matrices $T_0, \ldots, T_{N-1}$ and vectors $k_0, \ldots k_{N-1}$ are inputs. The matrix and key generation device according to the second invention includes a vector generation unit, a set generation unit, a matrix generation unit, and a key generation unit. The vector generation unit generates a vector $x_n$, of which a number of pieces of elements is $K_n$ and each of the elements is an element of the set $M_n$, with respect to each of $n=0, \ldots, N-1$ so that $x_n[i] \neq x_n[j]$ if $k_n[i] = k_n[j]$ at $i \neq j$. The set generation unit generates a set $B_{n,j}$ with respect to each of $n=0, \ldots, N-1$ and each of $j=1, \ldots, K_n$ so that individual elements correspond to combinations of $N-1$ pieces of elements, the $N-1$ pieces of elements being individually selected from sets $M_0, \ldots, M_{N-1}$ other than the set $M_n$, and $x_n[j]$ and the elements for all of the combinations are included. The matrix generation unit generates a matrix $T_n'$ with respect to each of $n=0, \ldots, N-1$ so that rows identical to $T_n[j]$ are included in a number equal to a number of elements of the set $B_{n,j}$ for all of $j=1, \ldots, K_n$. The key generation unit generates a vector $k_n'$ with respect to each of $n=0, \ldots, N-1$ so that an element of the matrix $T_n'$, the element corresponding to a row identical to $T_n[j]$, corresponds to a combination of $k_n[j]$ and an element of the set $B_{n,j}$ and further, the elements of the set $B_{n,j}$ are different from each other when there are a plurality of rows identical to $T_n[j]$.

Effects of the Invention

According to the matrix and key generation system and the matrix and key generation device of the present invention, a vector which includes duplicate elements and a matrix which is a coupling object can be respectively converted into a vector which includes no duplicate elements and a matrix corresponding to the vector.

BRIEF DESCRIPTION OF THE DRAWINGS

FIG. 2 illustrates a specific example of coupling of matrices.

FIG. 5 illustrates a state that sorting of orders of rows of the matrix $T_0$ and sorting of orders of elements of the vector $k_0$ illustrated in FIG. 2 are performed in accordance with the elements of the vector $k_0$ through secure computation while maintaining correspondence.

FIG. 6 illustrates vectors $x_0$, $x_1$, and $x_2$ which are results of step computation performed with respect to vectors $k_0$, $k_1$, and $k_2$ which are illustrated in FIG. 2 and are in the state that elements are concealed.

FIG. 7 illustrates examples of the matrix $T_0'$, the vector $k_0'$, the matrix $T_1'$, and the vector $k_1'$ in the state that elements are concealed in the case of coupling the matrix $T_0$ and the matrix $T_1$ illustrated in FIG. 2.

DETAILED DESCRIPTION OF THE EMBODIMENTS

Figure 1:
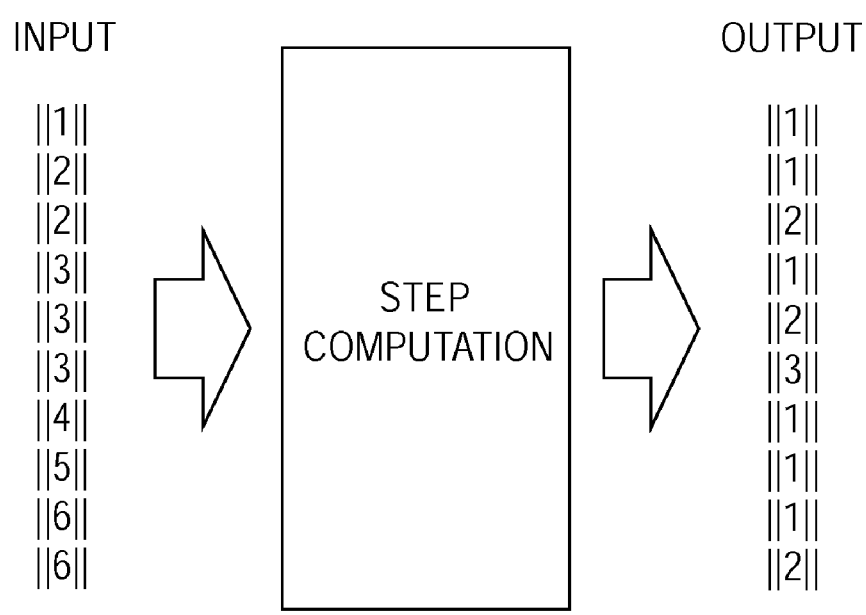
FIG. 1 illustrates a general outline of step computation.

Embodiments according to the present invention will be detailed below. Components having identical functions will be denoted by identical reference numerals and duplicate description will be omitted.

First Embodiment

In the description of the first embodiment, it is assumed that N is an integer and $1 \leq N$, n is an integer and $0 \leq n \leq N-1$, $K_n$ is an integer and $1 \leq K_n$, i and j are integers, $T_n$ is a matrix having $K_n$ rows, $k_n$ is a vector which includes $K_n$ pieces of elements, $T_n[j]$ is a row on the j-th order of the matrix $T_n$, $k_n[j]$ is an element on the j-th order of the vector $k_n$, $m_n$ is an upper limit number in which the elements of the vector $k_n$ are duplicated, $M_n$ is a set whose elements are $1, \ldots, m_n$, and ‖ ‖ is a sign representing concealed data. The j-th element of the vector k is an element corresponding to the j-th row of the matrix $T_n$. Here, the upper limit number $m_n$ does not have to be a number in which elements of the vector $k_n$ are actually duplicated but may be set to the maximum value in which elements are potentially duplicated.

<Coupling of Matrices>

A matrix expressing a table, a column vector expressing a key of each row of the matrix, and coupling of matrices will be first described. In the coupling of matrices, in the case where there is an element common to all of vectors $k_0, \ldots, k_{N-1}$, rows, which correspond to the common element, of matrices $T_0, \ldots, T_{N-1}$ are coupled to obtain one row. FIG. 2 illustrates a specific example of coupling of matrices. The matrices $T_0$, $T_1$, and $T_2$ are coupling objects. The vectors $k_0$, $k_1$, and $k_2$ are column vectors representing keys. Here, in this application, "matrix" represents a form for expressing a table and "vector" represents a form for expressing a key, so that each element of the matrix $T_n$ and the vector $k_n$ does not have to be limited to one numerical value but may be a combination of numerical values, a character string, or the like.

Here, coupling between the matrix $T_0$ and the matrix $T_1$ will be considered. The first and fourth elements of the vector $k_0$ representing keys of the matrix $T_0$ and the first and second elements of the vector $k_1$ representing keys of the matrix $T_1$ are "1", being mutually common. That is, the keys on the first and fourth rows of the matrix $T_0$ and the keys of the first and second rows of the matrix $T_1$ are "1", being mutually common. Further, the key on the third row of the matrix $T_0$ (the third element of the vector $k_0$) and the keys on the third and fourth rows of the matrix $T_1$ (the third and fourth elements of the vector $k_1$) are "3", being mutually common. Accordingly, in a matrix obtained by coupling the matrix $T_0$ and the matrix $T_1$, a result obtained by coupling the first row of the matrix $T_0$ and the first row of the matrix $T_1$ is on the first row, a result obtained by coupling the first row of the matrix $T_0$ and the second row of the matrix $T_1$ is on the second row, a result obtained by coupling the fourth row of the matrix $T_0$ and the first row of the matrix $T_1$ is on the third row, a result obtained by coupling the fourth row of the matrix $T_0$ and the second row of the matrix $T_1$ is on the fourth row, a result obtained by coupling the third row of the matrix $T_0$ and the third row of the matrix $T_1$ is on the fifth row, and a result obtained by coupling the third row of the matrix $T_0$ and the fourth row of the matrix $T_1$ is on the sixth row.

Subsequently, coupling of the matrix $T_0$, the matrix $T_1$, and the matrix $T_2$ will be considered. Among elements of the vector $k_0$ representing keys, elements of the vector $k_1$ representing keys, and elements of the vector $k_2$ representing keys, the first and fourth elements of the vector $k_0$, the first and second elements of the vector $k_1$, and the first element of the vector $k_2$ are "1", being mutually common. That is, the keys on the first and fourth rows of the matrix $T_0$, the keys on the first and second rows of the matrix $T_1$, and the keys on the first row of the matrix $T_2$ are "1", being mutually common. Accordingly, in a matrix obtained by coupling the matrix $T_0$, the matrix $T_1$, and the matrix $T_2$, a result obtained by coupling the first row of the matrix $T_0$, the first row of the matrix $T_1$, and the first row of the matrix $T_2$ is on the first row, a result obtained by coupling the first row of the matrix $T_0$, the second row of the matrix $T_1$, and the first row of the matrix $T_2$ is on the second row, a result obtained by coupling the fourth row of the matrix $T_0$, the first row of the matrix $T_1$, and the first row of the matrix $T_2$ is on the third row, and a result obtained by coupling the fourth row of the matrix $T_0$, the second row of the matrix $T_1$, and the first row of the matrix $T_2$ is on the fourth row.

<Configuration and Algorithm>

Figure 3:
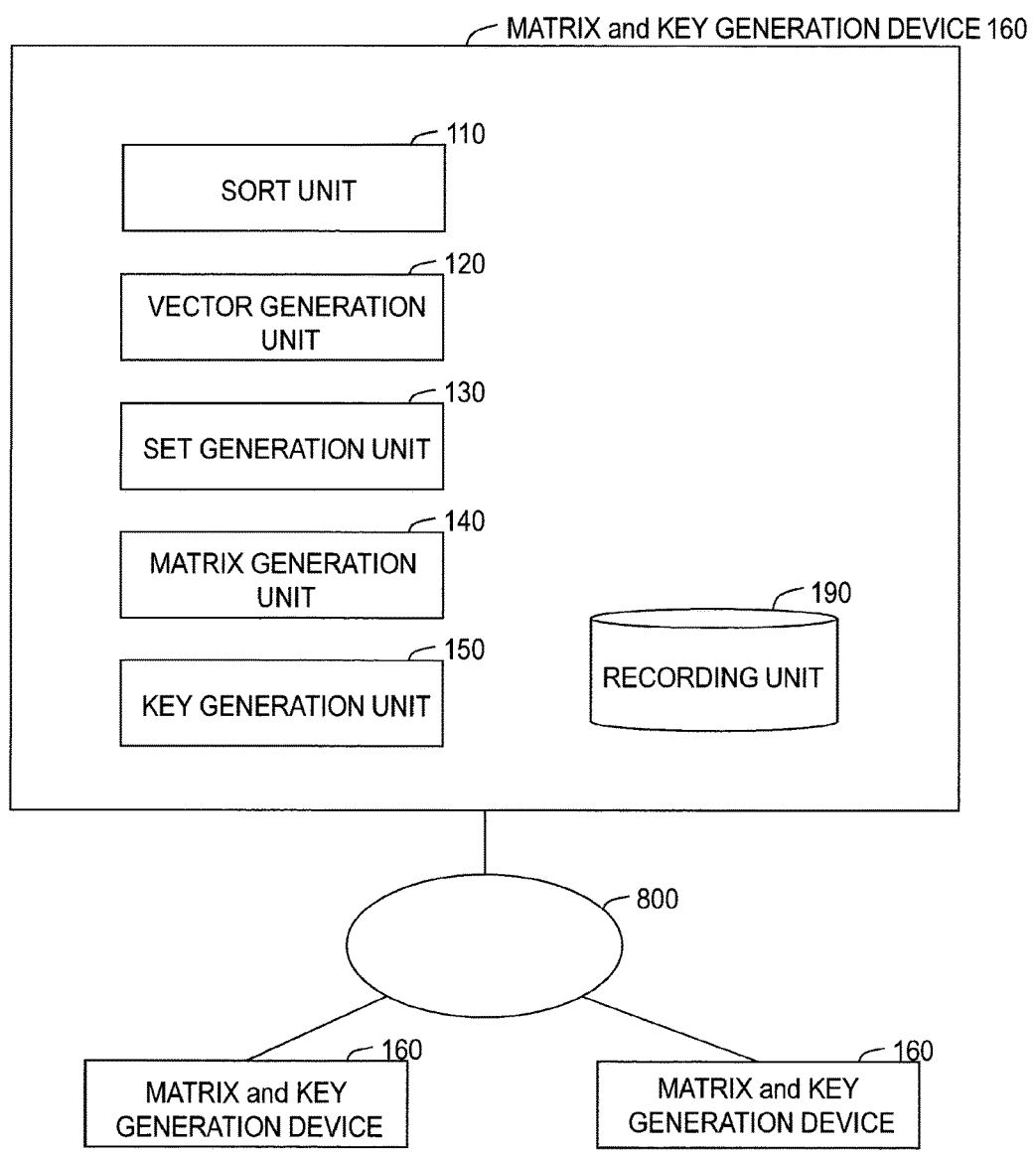
FIG. 3 illustrates a configuration example of a matrix and key generation system according to the first embodiment.
Figure 4:
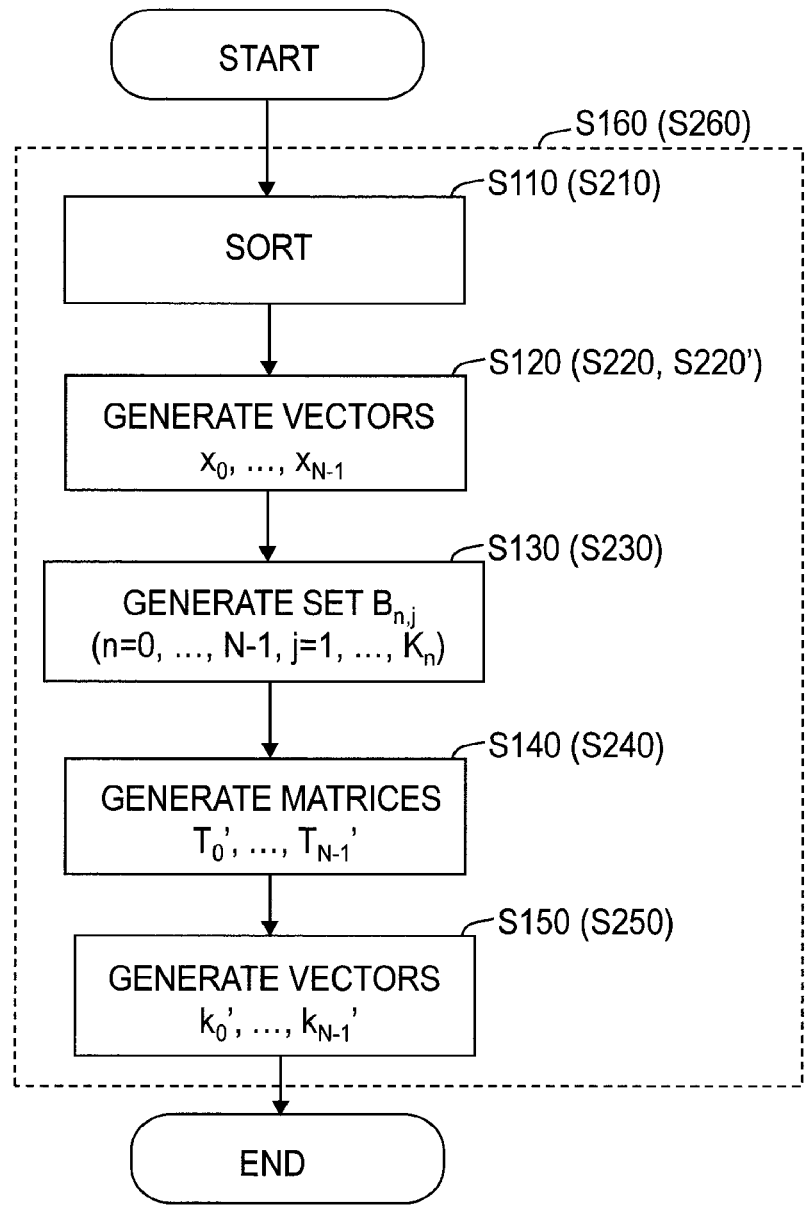
FIG. 4 illustrates a processing flow of the matrix and key generation system according to the first embodiment and a processing flow of a matrix and key generation device according to the second embodiment.

FIG. 3 illustrates a configuration example of a matrix and key generation system and FIG. 4 illustrates a processing flow of the matrix and key generation system. The matrix and key generation system includes three or more matrix and key generation devices 160 which are mutually connected via a network 800 and secure computation can be performed among these matrix and key generation devices 160. Each of the matrix and key generation devices 160 includes a sort unit 110, a vector generation unit 120, a set generation unit 130, a matrix generation unit 140, a key generation unit 150, and a recording unit 190. In the present embodiment, the numbers of rows and columns of the matrix $T_n$, the number of elements of the vector $k_n$, and the value $m_n$ are unconcealed information and each of the elements of the matrix $T_n$, and each of the elements of the vector $k_n$ are concealed information among the matrix and key generation devices 160. That is, shares of respective elements of the matrix $T_n$ and shares of respective elements of the vector $k_n$ are distributed and recorded in the recording units 190 of a plurality of matrix and key generation devices. Here, a "share" is data with which an original value can be reconstructed when a predetermined number of shares are known and is called "distributed data" in Non-patent Literature 4.

The sort unit 110 performs sorting of orders of rows of the matrix $T_n$ and sorting of orders of elements of the vector $k_n$ with respect to each of $n=0, \ldots, N-1$ through secure computation with the sort units 110 of other matrix and key generation devices 160 in accordance with the elements of the vector $k_n$ while maintaining correspondence, so as to update the matrices $T_0, \ldots, T_{N-1}$ and the vectors $k_0, \ldots, k_{N-1}$ with the matrices and the vectors after the sorting (S110). A method for performing the sort processing through the secure computation is specifically described in Non-patent Literature 1. Further, sorting may be performed in an ascending order or a descending order. FIG. 5 illustrates a state that sorting is performed with respect to orders of rows of the matrix $T_0$ and orders of elements of the vector $k_0$ illustrated in FIG. 2 through secure computation in accordance with the elements of the vector $k_0$ while maintaining correspondence. In this example, keys (elements of the vector $k_0$) having smaller values are on younger orders (upper). The vector generation unit 120, the set generation unit 130, the matrix generation unit 140, and the key generation unit 150 perform processing with respect to the matrices $T_0, \ldots, T_{N-1}$ and the vectors $k_0, \ldots, k_{N-1}$ which are updated by the sort unit 110.

The vector generation unit 120 generates a vector $x_n$, of which the number of pieces of elements is $K_n$ and each of the elements is concealed, with respect to each of $n=0, \ldots, N-1$ through secure computation with the vector generation units 120 of other matrix and key generation devices 160 so that $x_n[1]=\|1\|$ and $x_n[i]=\|x_n[i-1]+1\|$ if $k_n[i-1]=k_n[i]$ and $x_n[i]=\|1\|$ if $k_n[i-1]\neq k_n[i]$ with respect to $2\leq i\leq K_n$ (S120). This processing is same as the step computation illustrated in Non-patent Literature 2. Further, the technique for concealing values is described in Non-patent Literature 4 and the like. FIG. 6 illustrates vectors $k_0$, $k_1$, and $k_2$ of which elements are concealed and which are obtained by performing sorting by the sort unit 110 with respect to the vectors $k_0$, $k_1$, and $k_2$ illustrated in FIG. 2, and vectors $x_0$, $x_1$, and $x_2$ which are results of the step computation performed, by the vector generation unit 120, with respect to the vectors $k_0$, $k_1$, and $k_2$ after the sorting.

The set generation unit 130 generates a set $B_{n,j}$, of which each element is concealed, with respect to each of $n=0, \ldots, N-1$ and each of $j=1, \ldots, K_n$, through secure computation with the set generation units 130 of other matrix and key generation devices 160 so that individual elements correspond to combinations of N-1 pieces of elements, which are individually selected from sets $M_0, \ldots, M_{N-1}$ other than the set $M_n$, and $x_n[j]$, and the elements for all of the combinations are included (S130). For example, a combination is generated as (an element of $M_0, \ldots,$ an element of $M_{n-1}$, $x_n[j]$, an element of $M_{n+1}, \ldots,$ an element of $M_{N-1}$) so as to obtain one element. Further, a value decisively computed based on a combination (a value corresponding to a combination in a one-on-one state, in other words, a value obtained such that a different computation value is always obtained with respect to a different combination) may be set as an element. The above-mentioned "corresponding to a combination" represents inclusion of a value decisively computed from a combination other than the combination itself.

Processing of the set generation unit 130 will be described while referring to the vector $k_0$, the vector $k_1$, and the vector $k_2$ illustrated in FIG. 6, for example. The vector $k_0$ has two pieces of ||1|| among elements thereof and the number of each of other elements is one, so that the upper limit number $m_0$ in which elements are duplicated in the vector $k_0$ is 2. When the upper limit number in which elements are duplicated is checked in a similar manner, the upper limit number $m_1$ in which elements are duplicated in the vector $k_1$ is 2 and the upper limit number $m_2$ in which elements are duplicated in the vector $k_2$ is 3. Accordingly, set $M_0=\{||1||,||2||\}$, set $M_1=\{||1||,||2||\}$, and set $M_2=\{||1||,||2||,||3||\}$ are obtained. An example of processing for coupling the matrix $T_0$ and the matrix $T_1$ is first described. Since $x_0[1]=||1||$ and set $M_1=\{||1||, ||2||\}$ hold, combinations between $x_0[1]$ and elements of the set $M_1$ are $(||1||,||1||)$ and $(||1||,||2||)$. Accordingly, the set $B_{0,1}=\{(||1||,||1||), (||1||,||2||)\}$ is obtained. Further, since $x_0[2]=||2||$ and set $M_1=\{||1||,||2||\}$ hold, for example, combinations between $x_0[2]$ and elements of the set $M_1$ are $(||2||,||1||)$ and $(||2||,||2||)$ and combinations between elements of the set $M_0$ and $x_1[4]$ are $(||1||,||2||)$ and $(||2||,||2||)$. The processing may be performed in a similar manner with respect to other combinations. The case of processing for coupling the matrix $T_0$, the matrix $T_1$, and the matrix $T_2$ takes combinations of the three. Since $x_0[1]=||1||$, set $M_1=\{||1||,||2||\}$, and set $M_2=\{||1||,||2||,||3||\}$ hold, combinations among $x_0[1]$, elements of the set $M_1$, and elements of the set $M_2$ are $(||1||,||1||,||1||)$, $(||1||,||1||,||2||)$, $(||1||, ||1||,||3||)$, $(||1||,||2||,||1||)$, $(||1||,||2||,||2||)$, and $(||1||,||2||,||3||)$. Accordingly, set $B_{0,1}=\{\{(||1||,||1||,||1||), (||1||,||1||,||2||), (||1||,||1||,||3||), (||1||, ||2||,||1||), (||1||,||2||,||2||), (||1||,||2||,||3||)\}\}$ is obtained.

The matrix generation unit 140 generates a matrix $T_n'$, of which each element is concealed, with respect to each of $n=0, \ldots, N-1$ through secure computation with the matrix generation units 140 of other matrix and key generation devices 160, so that rows identical to $T_n[j]$ are included in the number equal to the number of elements of the set $B_{n,j}$ for all of $j=1, \ldots, K_n$ (S140). FIG. 7 illustrates examples of the matrix $T_0'$, the vector $k_0'$, the matrix $T_1'$, and the vector $k_1'$, of which elements are concealed, in the case of coupling the matrix $T_0$ and the matrix $T_1$ illustrated in FIG. 2. In the case of processing for coupling the matrix $T_0$ and the matrix $T_1$, the number of elements of the set $B_{0,1}$ is 2, so that two rows identical to $T_0[1]$ are generated. In a similar manner, since the number of elements of each of the set $B_{0,2}$, $B_{0,3}$, $B_{0,4}$, and $B_{0,5}$ is 2 as well, two identical rows are generated for each set. Accordingly, the matrix $T_0'$ includes 10 rows which include identical rows two by two. Further, the matrix $T_1'$ includes 8 rows which include identical rows two by two, as well.

The key generation unit 150 generates a vector $k_n'$, of which each element is concealed, with respect to each of $n=0, \ldots, N-1$ through secure computation with the key generation units 150 of other matrix and key generation devices 160 so that an element of the matrix $T_n'$ which corresponds to a row identical to $T_n[j]$ corresponds to a combination of $k_n[j]$ and an element of the set $B_{n,j}$ and further, the elements of the set $B_{n,j}$ are different from each other when there are a plurality of rows identical to $T_n[j]$ (S150). The matrix $T_0'$ has ten rows and the matrix $T_1'$ has eight rows, so that the number of elements of the vector $k_0'$ is ten and the number of elements of the vector $k_1'$ is eight. Since both of $T_0'[1]$ and $T_0'[2]$ are $T_0[1]$, $k_0'[1]$ is ($k_0[1]$, one element of $B_{0,1}$) and $k_0'[2]$ is ($k_0[1]$, another element of $B_{0,1}$). In FIG. 7, $k_0'[1]=(||1||,(||1||,||1||))$ and $k_0'[2]=(||1||,(||1||, ||2||))$ hold. That is, elements of the matrix $T_0'$ which correspond to a row identical to $T_0[1]$ correspond to combinations ($k_0'[1]$ and $k_0'[2]$) of the $k_0[1]$ and elements of the set $B_{0,1}$. Further, there are a plurality of rows identical to $T_0[1]$, so that the elements of the set $B_{0,1}$ are selected so that the selected elements are different from each other.

To "correspond to a combination" in the description of the key generation unit 150 also represents inclusion of a value decisively computed from a combination (a value corresponding to the combination in a one-on-one state) other than the combination itself. For example, f may be set as a function for decisively computing a value based on a combination and $k_0'[1]=||f(||1||,(||1||,||1||))||$ may be set. Here, f denotes a function permitting secure computation.

Apparent from FIG. 7, there is no duplication of elements in either the vector $k_0'$ or the vector $k_1'$. Thus, according to the matrix and key generation device of the first embodiment, a vector which includes duplicate elements and a matrix which is a coupling object can be respectively converted into a vector which includes no duplicate elements and a matrix corresponding to the vector.

[Modification]

Figure 8:
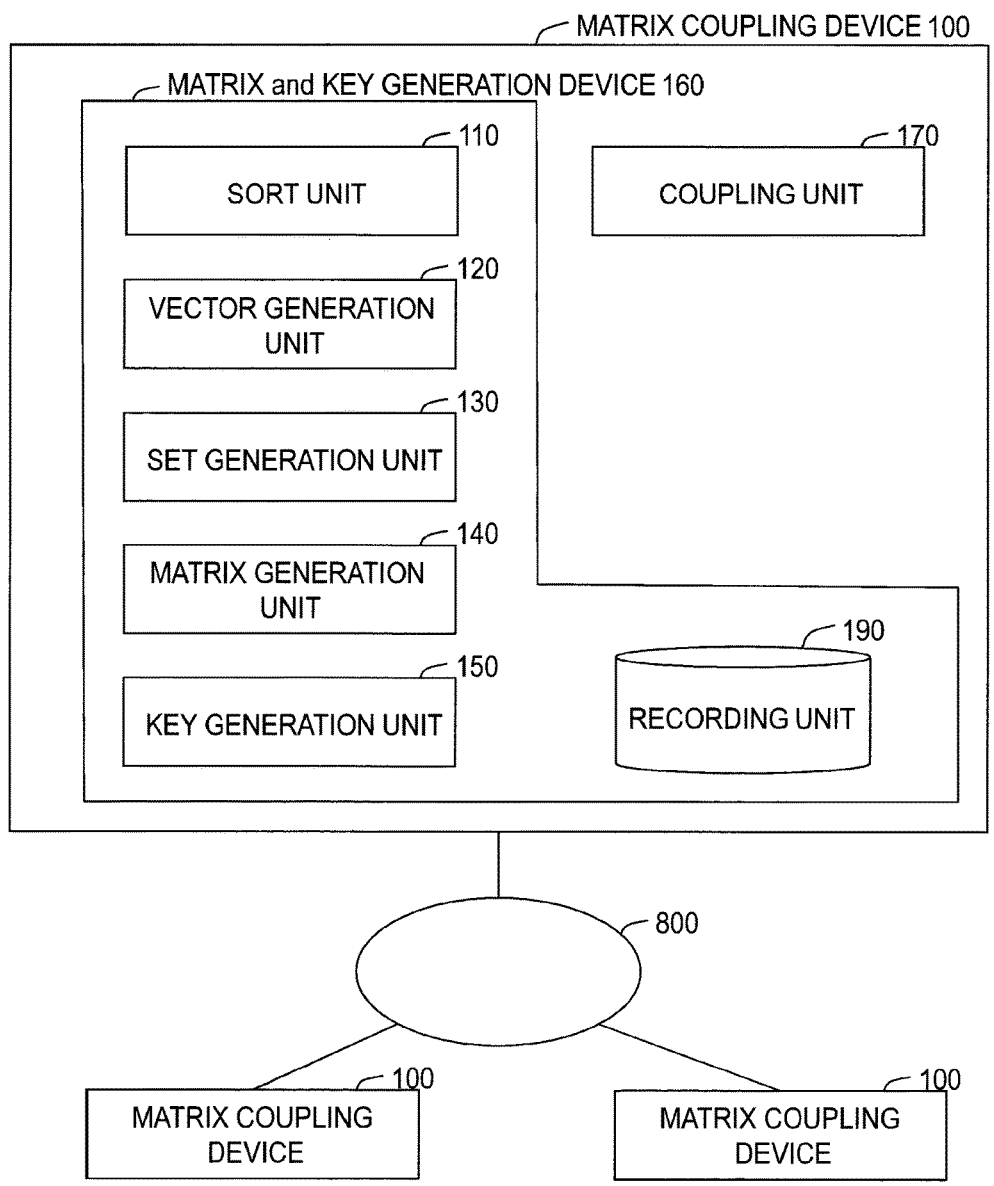
FIG. 8 illustrates a configuration example of a matrix coupling system according to a modification of the first embodiment.
Figure 9:
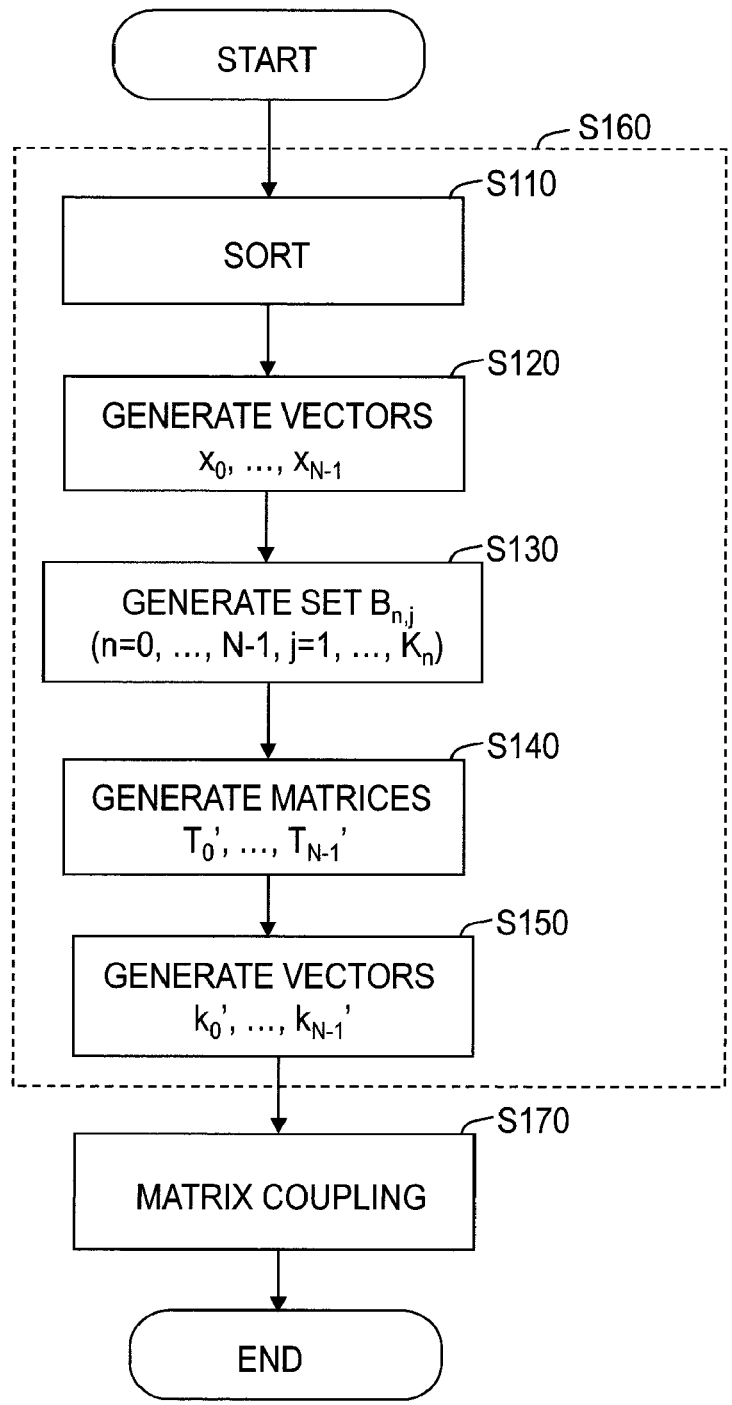
FIG. 9 illustrates a processing flow of the matrix coupling system according to the modification of the first embodiment.

FIG. 8 illustrates a configuration example of a matrix coupling system and FIG. 9 illustrates a processing flow of the matrix coupling system. The matrix coupling system includes three or more matrix coupling devices 100 which are mutually connected via the network 800 and secure computation can be performed among the matrix coupling devices 100. The matrix coupling device 100 includes the matrix and key generation device 160 and a coupling unit 170. The matrix and key generation device 160 and the matrix and key generation step S160 are same as those described in the first embodiment.

Figures 10, 11:
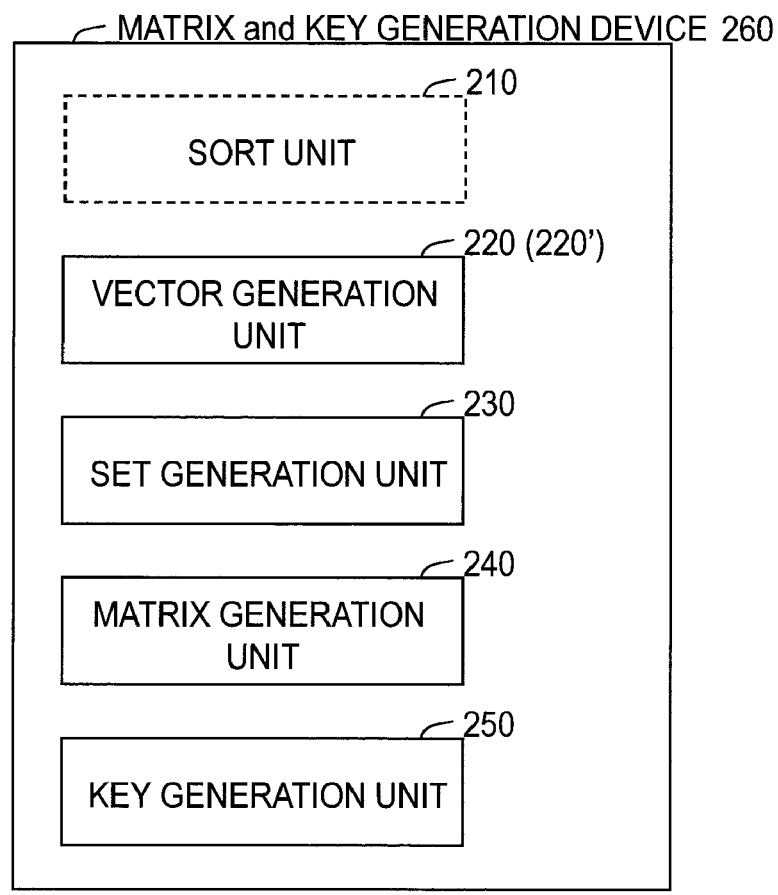
FIG. 10 illustrates a matrix obtained by coupling the matrix $T_0'$ and the matrix $T_1'$ which are illustrated in FIG. 7.
FIG. 11 illustrates a configuration example of a matrix and key generation device according to the second embodiment and a modification of the second embodiment.

In the case where there are elements common to all of the vectors $k_0', \ldots, k_{N-1}'$, the coupling unit 170 couples corresponding rows of the matrices $T_0', \ldots, T_{N-1}'$ for each of the common elements to generate one row through secure computation with the coupling units 170 of other matrix coupling devices 100 so as to generate a matrix of which each element is concealed (S170). As this processing, the technique of matrix coupling described in Non-patent Literature 3 may be employed. FIG. 10 illustrates a matrix obtained by coupling the matrix $T_0'$ and the matrix $T_1'$ which are illustrated in FIG. 7. It is understood that the matrix illustrated in FIG. 10 is a matrix obtained by concealing each element of a matrix obtained by coupling the matrix $T_0$ and the matrix $T_1$ illustrated in FIG. 2. Here, a corresponding relationship among rows may be recognized in the processing up to processing for obtaining the matrices $T_0', \ldots, T_{N-1}'$ and the vectors $k_0', \ldots, k_{N-1}'$. However, if rows are replaced at random in coupling of matrices through secure computation, recognition of the corresponding relationship among rows can be prevented.

In the technique of matrix coupling of Non-patent Literature 3, when a sum of the number of records in a table of the input (a sum of the number of rows in the case of expression in a matrix form) is denoted by Q, the communication amount is $O(Q \cdot \log Q)$. In the case of the matrix coupling system according to the present invention, when a sum of the number of rows is denoted by Q and the upper limit of the number of duplication is denoted by P, the communication amount can be set as $O(PQ \cdot \log Q)$. In the case where there is duplication among keys, processing is increased in the order of the square of P in general. However, processing is increased in the order of the first power of P in the present invention, being able to take advantage of Non-patent Literature 3 in which the communication amount can be reduced.

Second Embodiment

The case of the secure computation has been discussed in the first embodiment, but the idea of the present invention is applicable without limiting to the secure computation. When secure computation is not used, a plurality of matrix and key generation devices do not have to be used. One matrix and key generation device can convert a vector which represents keys and includes duplicate elements and a matrix which is a coupling object respectively into a vector which represents a key and includes no duplicate elements and a matrix corresponding to the vector. Accordingly, the case where concealment is not performed will be described in the second embodiment.

In the second embodiment, it is assumed that N is an integer and $1 \leq N$, n is an integer and $0 \leq n \leq N-1$, $K_n$ is an integer and $1 \leq K_n$, i and j are integers, $T_n$ is a matrix having $K_n$ rows, $k_n$ is a vector which includes $K_n$ pieces of elements, $T_n[j]$ is a row on the j-th order of the matrix $T_n$, $k_n[j]$ is an element on the j-th order of the vector $k_n$, $m_n$ is the upper limit number in which the elements of the vector $k_n$ are duplicated, and matrices $T_0, \ldots, T_{N-1}$ and vectors $k_0, \ldots, k_{N-1}$ are inputs. Further, it is assumed that $M_n$ is a set which is composed of $m_n$ pieces of elements and of which $M_n[i]=i$ is satisfied.

FIG. 11 illustrates a configuration example of a matrix and key generation device according to the second embodiment, and FIG. 4 illustrates an example of a processing flow of the matrix and key generation device according to the second embodiment. A matrix and key generation device 260 includes a sort unit 210, a vector generation unit 220, a set generation unit 230, a matrix generation unit 240, and a key generation unit 250. The sort unit 210 performs sorting of orders of rows of the matrix $T_n$ and sorting of orders of elements of the vector $k_n$ with respect to each of $n=0, \ldots, N-1$ in accordance with the elements of the vector $k_n$ while maintaining correspondence so as to update the matrices $T_0, \ldots, T_{N-1}$ and the vectors $k_0, \ldots, k_{N-1}$ with the matrices and the vectors after the sorting (S210). The vector generation unit 220, the set generation unit 230, the matrix generation unit 240, and the key generation unit 250 perform processing with respect to the matrices $T_0, \ldots, T_{N-1}$ and the vectors $k_0, \ldots, k_{N-1}$ which are updated by the sort unit 210.

The vector generation unit 220 generates a vector $x_n$ with respect to each of $n=0, \ldots, N-1$ so that $x_n[1]=1$ and $x_n[i]=x_n[i-1]+1$ if $k_n[i-1]=k_n[i]$ and $x_n[i]=1$ if $k_n[i-1] \neq k_n[i]$ with respect to $2 \leq i \leq K_n$ (S220). The set generation unit 230 generates a set $B_{n,j}$ with respect to each of $n=0, \ldots, N-1$ and each of $j=1, \ldots, K_n$ so that individual elements correspond to combinations of N-1 pieces of elements, which are individually selected from sets $M_0, \ldots, M_{N-1}$ other than the set $M_n$, and $x_n[j]$, and the elements for all of the combinations are included (S230). The matrix generation unit 240 generates a matrix $T_n'$ with respect to each of $n=0, \ldots, N-1$ so that rows identical to $T_n[j]$ are included in the number equal to the number of elements of the set $B_{n,j}$ for all of $j=1, \ldots, K_n$ (S240). The key generation unit 250 generates a vector $k_n'$ with respect to each of $n=0, \ldots, N-1$ so that an element of the matrix $T_n'$ which corresponds to a row identical to $T_n[j]$ corresponds to a combination of $k_n[j]$ and an element of the set $B_{n,j}$ and further, the elements of the set $B_{n,j}$ are different from each other when there are a plurality of rows identical to $T_n[j]$ (S250).

Each processing is different from the processing of the first embodiment only in that secure computation is not performed. Therefore, in the case where the matrices $T_0$ and $T_1$ and the vectors $k_0$ and $k_1$ illustrated in FIG. 2 are inputted, the matrices $T_0'$ and $T_1'$ and the vectors $k_0'$ and $k_1'$ to be outputted are matrices and vectors in which each element illustrated in FIG. 7 is not concealed. Thus, according to the matrix and key generation device of the second embodiment, a vector which includes duplicate elements and a matrix which is a coupling object can be respectively converted into a vector which includes no duplicate elements and a matrix corresponding to the vector.

[Modification]

A generic concept of the second embodiment will be derived in this modification. In the present modification, the sort unit 210 is omitted and the vector generation unit 220 is replaced with a vector generation unit 220'. Further, in the present modification, $M_n$ is not limited to a set of $M_n[i]=i$ but $M_n$ is a set composed of $m_n$ pieces of elements which are different from each other and $M_n[i]$ is an element on the i-th order of the set $M_n$. The functional configuration of a matrix and key generation device according to the present modification is illustrated in FIG. 11 and a processing flow is illustrated in FIG. 4. In the present modification, the vector generation unit 220', the set generation unit 230, the matrix generation unit 240, and the key generation unit 250 perform processing with respect to the matrices $T_0, \ldots, T_{N-1}$ and the vectors $k_0, \ldots, k_{N-1}$ which are inputted (the sort step S210 is not performed).

The vector generation unit 220' generates a vector $x_n$, of which the number of pieces of elements is $K_n$ and each of the elements is an element of the set $M_n$, with respect to each of $n=0, \ldots, N-1$ so that $x_n[i] \neq x_n[j]$ if $k_n[i]=k_n[j]$ at $i \neq j$. The processing of the vector generation unit 220 in the present modification is one processing which satisfies a condition of processing of the vector generation unit 220' which is applicable when the vector $k_n$ is preliminarily subjected to sorting. Accordingly, the invention of the present modification is the general concept of the invention of the second embodiment.

Since whether or not sorting is performed does not exert any influence on processing of the set generation unit 230, the matrix generation unit 240, and the key generation unit 250 when the vector $x_n$ is generated as described above, the matrix and key generation device of the present modification is also capable of converting a vector which includes duplicate elements and a matrix which is a coupling object respectively into a vector which includes no duplicate elements and a matrix corresponding to the vector.

[Program, Recording Medium]

The above-described various types of processing may be executed not only in a time-series manner in accordance with the description but also in a parallel manner or an independent manner, depending on processing capability of the device which executes the processing or as necessary. Further, it is indisputable that alterations can be arbitrarily made without departing from the intent of the present invention.

In a case where the above-described configuration is implemented by a computer, processing contents of functions which should be obtained by respective devices are described by a program. By executing this program by a computer, the above-described processing functions are implemented on the computer.

The program in which the processing contents are described can be recorded in a computer-readable recording medium. Any recording medium such as a magnetic recording device, an optical disk, a magneto-optical recording medium, and a semiconductor memory may be employed as the computer-readable recording medium.

Moreover, this program is distributed by selling, transferring, or lending a portable recording medium such as a DVD and a CD-ROM in which the program is recorded, for example. Further, this program may be distributed such that this program is preliminarily stored in a storage device of a server computer and is transferred from the server computer to other computers through the network.

A computer which executes such program once stores the program which is recorded in a portable recording medium or the program transferred from the server computer in a storage device thereof, for example. Then, at the time of execution of processing, this computer reads the program which is stored in a recording medium thereof and executes processing in accordance with the program which is read. Moreover, as another executing configuration of this program, a computer may directly read the program from a portable recording medium so as to execute processing in accordance with the program. Furthermore, every time the program is transferred to the computer from the server computer, the computer may sequentially execute the processing in accordance with the received program. Alternatively, the above-described processing may be executed by so-called application service provider (ASP) type service by which a processing function is implemented only by an executing instruction of processing and result acquisition, without transferring the program to the computer from the server computer. Here, it should be noted that the program according to this executing configuration includes information which is provided for processing performed by an electronic calculator and is equivalent to the program (such as data which is not a direct instruction to the computer but has a property specifying the processing of the computer).

In this configuration, the devices are assumed to be configured as a result of a predetermined program executed on a computer. However, at least part of these processing contents may be implemented on the hardware.

INDUSTRIAL APPLICABILITY

The present invention is applicable to statistical processing and analysis of data using a computer.

DESCRIPTION OF REFERENCE NUMERALS

100 matrix coupling device
110, 210 sort unit
120, 220 vector generation unit
130, 230 set generation unit
140, 240 matrix generation unit
150, 250 key generation unit
160, 260 matrix and key generation device
170 coupling unit
190 recording unit
800 network

What is claimed is:

1. A matrix coupling device which constitutes a matrix coupling system in which secure computation is performed among three or more matrix coupling devices which are mutually connected via a network and which each include a matrix and key generation device respectively, the matrix coupling device comprising:

the respective matrix and key generation device; and
processing circuitry, wherein
in a case where there are elements common to all of vectors $k_0', \ldots, k_{N-1}'$, the processing circuitry couples corresponding rows of matrices $T_0', \ldots, T_{N-1}'$ for each of the common elements to generate one row through secure computation with processing circuitry of other matrix coupling devices so as to generate a matrix of which each element is concealed,
wherein N is an integer which is 1 or larger, n is an integer which is between 0 and N−1 inclusive, $K_n$ is an integer which is 1 or larger, i and j are integers, $T_n$ is a matrix having $K_n$ rows, $k_n$ is a vector which includes $K_n$ pieces of elements, $T_n[j]$ is a row on a j-th order of the matrix $T_n$, $k_n[j]$ is an element on a j-th order of the vector $k_n$, $m_n$ is an upper limit number in which the elements of the vector $k_n$ are duplicated, $M_n$ is a set whose elements are $1, \ldots, m_n$, and $\| \ \|$ is a sign representing concealed data,
the element on the j-th order of the vector $k_n$ is an element corresponding to a row on the j-th order of the matrix $T_n$,
numbers of rows and columns of the matrix $T_n$, a number of the elements of the vector $k_n$, and a value $m_n$ are unconcealed information, and
each element of the matrix $T_n$ and each of the elements of the vector $k_n$ are concealed among the matrix and key generation devices,
the respective matrix and key generation device comprising processing circuitry configured to
perform sorting of orders of rows of the matrix $T_n$ and sorting of orders of elements of the vector $k_n$ with respect to each of $n=0, \ldots, N-1$ through secure computation with processing circuitry of the other matrix and key generation devices in accordance with the elements of the vector $k_n$ while maintaining correspondence, so as to update matrices $T_0, \ldots, T_{N-1}$ and vectors $k_0, k_{N-1}$ with the matrices and the vectors after the sorting,
perform processing with respect to the matrices $T_0, \ldots, T_{N-1}$ and the updated vectors $k_0, \ldots, k_{N-1}$,
generate a vector $x_n$, of which a number of pieces of elements is $K_n$ and each of the elements is concealed, with respect to each of $n=0, \ldots, N-1$ through secure computation with the processing circuitry of other matrix and key generation devices so that $x_n[1]=\|1\|$ and $x_n[i]=\|x_n[i-1]+1\|$ if $k_n[i-1]=k_n[i]$ and $x_n[i]=\|1\|$ if $k_n[i-1] \neq k_n[i]$ with respect to $2 \le i \le K_n$,
generate a set $B_{n,j}$, of which each element is concealed, with respect to each of $n=0, \ldots, N-1$ and each of $j=1, \ldots, K_n$ through secure computation with the processing circuitry of the other matrix and key generation devices so that individual elements correspond to combinations of N−1 pieces of elements, the N−1 pieces of elements being individually selected from sets $M_0, \ldots, M_{N-1}$ other than the set $M_n$, and $x_n[j]$, and the elements for all of the combinations are included, generate a matrix $T_n'$, of which each element is concealed, with respect to each of $n=0, \ldots, N-1$ through secure computation with the processing circuitry of the other matrix and key generation devices, so that rows identical to $T_n[j]$ are included in a number equal to a number of elements of the set $B_{n,j}$ for all of $j=1, \ldots, K_n$, and generate a vector $k_n'$, of which each element is concealed, with respect to each of $n=0, \ldots, N-1$ through secure computation with the processing circuitry of the other matrix and key generation devices, so that an element of the matrix $T_n'$, the element corresponding to a row identical to $T_n[j]$, corresponds to a combination of $k_n[j]$ and an element of the set $B_{n,j}$ and further, the elements of the set $B_{n,j}$ are different from each other when there are a plurality of rows identical to $T_n[j]$.

2. A method implemented by a matrix coupling device which constitutes a matrix coupling system in which secure computation is performed among three or more matrix coupling devices which are mutually connected via a network and which each include a matrix and key generation device respectively, the method comprising:

in a case where there are elements common to all of vectors $k_0', \ldots, k_{N-1}'$, coupling corresponding rows of matrices $T_0', \ldots, T_{N-1}'$ for each of the common elements to generate one row through secure computation of other matrix coupling devices so as to generate a matrix of which each element is concealed, wherein N is an integer which is 1 or larger, n is an integer which is between 0 and N−1 inclusive, $K_n$ is an integer which is 1 or larger, i and j are integers, $T_n$ is a matrix having $K_n$ rows, $k_n$ is a vector which includes $K_n$ pieces of elements, $T_n[j]$ is a row on a j-th order of the matrix $T_n$, $k_n[j]$ is an element on a j-th order of the vector $k_n$, $m_n$ is an upper limit number in which the elements of the vector $k_n$ are duplicated, $M_n$ is a set whose elements are $1, \ldots, m_n$, and $\| \|$ is a sign representing concealed data, the element on the j-th order of the vector $k_n$ is an element corresponding to a row on the j-th order of the matrix $T_n$, numbers of rows and columns of the matrix $T_n$, a number of the elements of the vector $k_n$, and a value $m_n$ are unconcealed information, and each element of the matrix $T_n$ and each of the elements of the vector $k_n$ are concealed among the matrix and key generation devices, the method further including, at the respective matrix and key generation device, performing sorting of orders of rows of the matrix $T_n$ and sorting of orders of elements of the vector $k_n$ with respect to each of $n=0, \ldots, N-1$ through secure computation with the other matrix and key generation devices in accordance with the elements of the vector $k_n$ while maintaining correspondence, so as to update matrices $T_0, \ldots, T_{N-1}$ and vectors $k_0, \ldots, k_{N-1}$ with the matrices and the vectors after the sorting, performing processing with respect to the matrices $T_0, \ldots, T_{N-1}$ and the updated vectors $k_0, \ldots, k_{N-1}$, generating a vector $x_n$, of which a number of pieces of elements is $K_n$ and each of the elements is concealed, with respect to each of $n=0, \ldots, N-1$ through secure computation with the other matrix and key generation devices so that $x_n[1]=\|1\|$ and $x_n[i]=\|x_n[i-1]+1\|$ if $k_n[i-1]=k_n[i]$ and $x_n[i]=\|1\|$ if $k_n[i-1]\neq k_n[i]$ with respect to $2 \leq i \leq K_n$, generating a set $B_{n,j}$, of which each element is concealed, with respect to each of $n=0, \ldots, N-1$ and each of $j=1, \ldots, K_n$ through secure computation with the other matrix and key generation devices so that individual elements correspond to combinations of N−1 pieces of elements, the N−1 pieces of elements being individually selected from sets $M_0, \ldots, M_{N-1}$ other than the set $M_n$, and $x_n[j]$, and the elements for all of the combinations are included, generating a matrix $T_n'$, of which each element is concealed, with respect to each of $n=0, \ldots, N-1$ through secure computation with the other matrix and key generation devices, so that rows identical to $T_n[j]$ are included in a number equal to a number of elements of the set $B_{n,j}$ for all of $j=1, \ldots, K_n$, and generating a vector $k_n'$, of which each element is concealed, with respect to each of $n=0, \ldots, N-1$ through secure computation with the other matrix and key generation devices, so that an element of the matrix $T_n'$, the element corresponding to a row identical to $T_n[j]$, corresponds to a combination of $k_n[j]$ and an element of the set $B_{n,j}$ and further, the elements of the set $B_{n,j}$ are different from each other when there are a plurality of rows identical to $T_n[j]$.

* * * * *